US011765041B1

(12) United States Patent
Sobhani et al.

(10) Patent No.: US 11,765,041 B1
(45) Date of Patent: Sep. 19, 2023

(54) METHODS AND SYSTEMS FOR IMPLEMENTING A HIGH RADIX NETWORK TOPOLOGY

(71) Applicants: Ashkan Sobhani, Kanata (CA); Amir Baniamerian, Montreal (CA); Xingjun Chu, Ottawa (CA)

(72) Inventors: Ashkan Sobhani, Kanata (CA); Amir Baniamerian, Montreal (CA); Xingjun Chu, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/945,857

(22) Filed: Sep. 15, 2022

(51) Int. Cl.
*G06F 15/177* (2006.01)
*H04L 41/12* (2022.01)

(52) U.S. Cl.
CPC .................................. *H04L 41/12* (2013.01)

(58) Field of Classification Search
CPC ...................................................... H04L 41/12
See application file for complete search history.

(56) References Cited

U.S. PATENT DOCUMENTS

| | | | | |
|---|---|---|---|---|
| 9,301,026 | B2 * | 3/2016 | Srinivas | .................. H04L 41/12 |
| 2010/0049942 | A1 * | 2/2010 | Kim | .................... G06F 13/4221 |
| | | | | 712/30 |

FOREIGN PATENT DOCUMENTS

| | | | | |
|---|---|---|---|---|
| CA | 2641197 | A1 * | 5/2009 | ......... H04L 12/2697 |
| EP | 2451127 | A1 * | 5/2012 | ........... H04B 10/272 |
| JP | 2012105265 | A | * | 5/2012 ....... G06F 15/17312 |

OTHER PUBLICATIONS

J. Kim et al., "Technology-driven, highly-scalable dragonfly topology", International Symposium on Computer Architecture, pp. 77-88, IEEE, 2008.
M. Besta, T Hoefler, "Slim fly: a cost effective low-diameter network topology", Conference for High Performance Computing, Networking, Storage and Analysis, pp. 348-359, IEEE, 2014.
A. Valadarsky et. al., "Xpander: Towards optimal-performance datacenters", Conference on emerging Networking Experiments and Technologies, pp. 205-219, 2016.
Ch. Leiserson, "Fat-trees: universal networks for hardware-efficient supercomputing", Transactions on Computers, vol. 10, pp. 892-901, IEEE, 1985.

* cited by examiner

Primary Examiner — Hee Soo Kim

(57) ABSTRACT

Methods and systems related to construction and implementation of high radix topologies are disclosed. The nodes of the network topology are divided into a number of groups. Intra-group connections are constructed by connecting the nodes of each group according to a first complementary base graph. Inter-group connections are constructed based on a second complementary base graph and a plurality of permutation matrices. Each permutation matrix represents a pattern for selecting source group and destination group for each inter-group connection. One permutation matrix is randomly assigned to each edge of the second complementary base graph. An inter-group connection is constructed by identifying a source node and a destination node corresponding to a selected edge of the second complementary base graph, and identifying a source group and a destination group according to the permutation matrix assigned to the selected edge.

20 Claims, 9 Drawing Sheets

Complete base graph 502

First complementary base graph 504

Second complementary base graph 506

Group-2 514

Group-1 512

Group-3 516

Table 520

|  | Permutation matrix | Inter-group pattern (source->destination) |
|---|---|---|
| 1-shift | $\begin{bmatrix} 0 & 1 & 0 \\ 0 & 0 & 1 \\ 1 & 0 & 0 \end{bmatrix}$ | 1->2<br>2->3<br>3->1 |
| 2-shift | $\begin{bmatrix} 0 & 0 & 1 \\ 1 & 0 & 0 \\ 0 & 1 & 0 \end{bmatrix}$ | 1->3<br>2->1<br>3->2 |

Second complementary base graph 506

METHODS AND SYSTEMS FOR IMPLEMENTING A HIGH RADIX NETWORK TOPOLOGY

FIELD

The present disclosure is related to computer networks, including methods and systems related to constructing and implementing direct-connect high radix network topologies.

BACKGROUND

In many current computer networks, the performance and speed of the network (particularly for data centers and high performance computing applications) are not dependent on the hardware technology but rather on communication efficiency. Communication efficiency and performance can be directly affected by the design of the topology of the computer network. For example, the network diameter (i.e., the shortest path between the two most distance nodes of the network) can affect the variance of communication latency; the mean path length (i.e., the average number of links along the shortest path for between each pair of nodes) can affect communication latency; and the bisection width (i.e., the bandwidth between two halves of the network) can affect fault tolerance of the network. Other characteristics of the network topology, such as symmetry, modularity and expandability may affect the practical implementation of the network topology, such as ease of deployment and ease of troubleshooting.

Topologies for a data center can be categorized into multistage topologies and high radix topologies. Radix refers to the number of input/output (I/O) ports available at a switch to connect to other switches. A high radix topology is one in which the nodes of the topology (implemented by switches of the network) are each able to connect with many other nodes, such that every node is an edge node (e.g., representing an edge switch/router) that directly connects to other edge nodes (i.e., the network does not have any intermediary switches that are only used for routing traffic) and thus achieving a low network diameter.

A challenge with real-world deployment of high radix topologies is the complexity of connections between switches, which may be an impediment to practical implementation. Accordingly, it would be useful to provide a solution for construction and implementation of high radix topologies.

SUMMARY

In various examples, the present disclosure describes methods and systems for constructing and implementing a high radix topology. The disclosed methods and systems enable high radix topologies to be constructed and implemented in a manner that enables the topology to be expanded to include more nodes, in a relatively straightforward manner. Further, the disclosed methods and systems enable practical deployment of the constructed high radix topology, by introducing the use of patterns to connect nodes, thus reducing the complexity of connections. The present disclosure, in various examples, provides a technical advantage that a high radix network topology can be constructed and implemented in a practical manner, thus enabling the benefits of high radix switches and low diameter network topologies to be realized.

In an example aspect, the present disclosure describes a method for constructing a network topology for a high radix network, nodes of the network topology corresponding to high radix switches of the high radix network. The method includes: determining a number of groups into which the nodes of the network topology are divided; obtaining a first complementary base graph and a second complementary base graph, wherein the first and second complementary base graphs are complementary to each other and combine to form a complete graph; constructing intra-group connections of the network topology by connecting the nodes of each group according to the first complementary base graph; constructing inter-group connections of the network topology by: generating a plurality of permutation matrices, each permutation matrix representing a pattern for selecting a source group and a destination group for each respective inter-group connection of each group; and randomly selecting one permutation matrix to assign to each edge of the second complementary base graph; wherein an inter-group connection is constructed by identifying a source node and a destination node corresponding to a selected edge of the second complementary base graph, identifying a source group and a destination group according to the permutation matrix assigned to the selected edge, and connecting the source node in the source group to the destination node in the destination group. The method also includes: outputting the constructed topology to be implemented in the high radix network.

In an example of the preceding aspect of the method, the number of groups may be computed based on predefined configuration parameters of the high radix network.

In an example of any of the preceding aspects of the method, obtaining the first complementary base graph and the second complementary base graph may include receiving one of the first complementary base graph or the second complementary base graph, and generating the other of the first complementary base graph or the second complementary base graph.

In an example of any of the preceding aspects of the method, obtaining the first complementary base graph and the second complementary base graph may include: receiving a value for a density parameter representing relative inter-group connectivity compared to intra-group connectivity; generating the second complementary base graph based on the density parameter; and generating the first complementary base graph to be complementary to the second complementary base graph.

In an example of any of the preceding aspects of the method, there may be no overlap of any row or any column between any pair of permutation matrices in the plurality of permutation matrices, and none of the permutation matrices may contain any row or any column that overlaps with an identity matrix.

In an example of any of the preceding aspects of the method, each permutation matrix may be a square matrix having dimensionality equal to the number of groups.

In an example of the preceding aspects of the method, generating the plurality of permutation matrices may include: generating each permutation matrix by applying a respective amount of circular shift to an identity matrix having dimensionality equal to the number of groups; and each permutation matrix may be generated by a respective different amount of circular shift and each permutation matrix is unique in the plurality of permutation matrices.

In an example of any of the preceding aspects of the method, a plurality of high radix switches may be represented by at least one virtual switch, and at least one node of the constructed topology may correspond to the at least one virtual switch and may be implemented using the plurality of high radix switches.

In an example of the preceding aspect of the method, the method may include: prior to outputting the constructed topology, replacing the at least one node corresponding to the at least one virtual switch with a complete graph having a number of nodes equal to a number of switches represented by the at least one virtual switch.

In another example aspect, the present disclosure describes a computing system for constructing a network topology for a high radix network, nodes of the network topology corresponding to high radix switches of the high radix network. The computing system includes a processing unit configured to execute instructions to cause the computing system to: determine a number of groups into which the nodes of the network topology are divided; obtain a first complementary base graph and a second complementary base graph, wherein the first and second complementary base graphs are complementary to each other and combine to form a complete graph; construct intra-group connections of the network topology by connecting the nodes of each group according to the first complementary base graph; construct inter-group connections of the network topology by: generating a plurality of permutation matrices, each permutation matrix representing a pattern for selecting a source group and a destination group for each respective inter-group connection of each group; and randomly selecting one permutation matrix to assign to each edge of the second complementary base graph; wherein an inter-group connection is constructed by identifying a source node and a destination node corresponding to a selected edge of the second complementary base graph, identifying a source group and a destination group according to the permutation matrix assigned to the selected edge, and connecting the source node in the source group to the destination node in the destination group. The processing unit is further configured to execute instructions to cause the computing system to: output the constructed topology to be implemented in the high radix network.

In an example of the preceding aspect of the computing system, the number of groups may be computed based on predefined configuration parameters of the high radix network.

In an example of any of the preceding aspects of the computing system, the processing unit may be configured to execute instructions to cause the computing system to obtain the first complementary base graph and the second complementary base graph by receiving one of the first complementary base graph or the second complementary base graph, and generating the other of the first complementary base graph or the second complementary base graph.

In an example of any of the preceding aspects of the computing system, the processing unit may be configured to execute instructions to cause the computing system to obtain the first complementary base graph and the second complementary base graph by: receiving a value for a density parameter representing relative inter-group connectivity compared to intra-group connectivity; generating the second complementary base graph based on the density parameter; and generating the first complementary base graph to be complementary to the second complementary base graph.

In an example of any of the preceding aspects of the computing system, there may be no overlap of any row or any column between any pair of permutation matrices in the plurality of permutation matrices, and none of the permutation matrices may contain any row or any column that overlaps with an identity matrix.

In an example of any of the preceding aspects of the computing system, each permutation matrix may be a square matrix having dimensionality equal to the number of groups.

In an example of the preceding aspect of the computing system, the processing unit may be configured to execute instructions to cause the computing system to generate the plurality of permutation matrices by: generating each permutation matrix by applying a respective amount of circular shift to an identity matrix having dimensionality equal to the number of groups; and each permutation matrix may be generated by a respective different amount of circular shift and each permutation matrix is unique in the plurality of permutation matrices.

In an example of any of the preceding aspects of the computing system, a plurality of high radix switches may be represented by at least one virtual switch, and at least one node of the constructed topology may correspond to the at least one virtual switch and may be implemented using the plurality of high radix switches.

In an example of the preceding aspect of the computing system, the processing unit may be configured to execute instructions to cause the computing system to: prior to outputting the constructed topology, replace the at least one node corresponding to the at least one virtual switch with a complete graph having a number of nodes equal to a number of switches represented by the at least one virtual switch.

In another example aspect, the present disclosure describes a non-transitory computer readable medium for constructing a network topology for a high radix network, nodes of the network topology corresponding to high radix switches of the high radix network, the computer readable medium having instructions encoded thereon, wherein the instructions are executable by a processing unit of a computing system to cause the computing system to: determine a number of groups into which the nodes of the network topology are divided; obtain a first complementary base graph and a second complementary base graph, wherein the first and second complementary base graphs are complementary to each other and combine to form a complete graph; construct intra-group connections of the network topology by connecting the nodes of each group according to the first complementary base graph; construct inter-group connections of the network topology by: generating a plurality of permutation matrices, each permutation matrix representing a pattern for selecting a source group and a destination group for each respective inter-group connection of each group; and randomly selecting one permutation matrix to assign to each edge of the second complementary base graph; wherein an inter-group connection is constructed by identifying a source node and a destination node corresponding to a selected edge of the second complementary base graph, identifying a source group and a destination group according to the permutation matrix assigned to the selected edge, and connecting the source node in the source group to the destination node in the destination group. The instructions are further executable to cause the computing system to: output the constructed topology to be implemented in the high radix network.

In an example of the preceding aspects of the computer readable medium, the instructions may cause the computing system to perform any of the preceding aspects of the method.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

High radix topologies have been of interest for improving efficiency of communications in a network. In particular, due to improvements in computing hardware, the performance of data centers and high performance computing may be determined more by the network topology rather than the hardware technology.

In the present disclosure, the terms "network" and "switch" may be mainly used to refer to real-world connections (e.g., using real-world wires or cables to connect physical hardware), and the terms "topology" and "node" may be mainly used to refer to the logical representation of a network and a switch, respectively, for example as a graph. However, it should be understood that a topology is implemented as a real-world network, thus construction of a topology is not only a mathematical exercise but rather has technical application. Further, it should be understood that in some contexts the term network may be used interchangeably with topology and the term switch may be used interchangeably with node.

Advantages of using a high radix topology for a network, compared to other (low radix) topologies, include reduction in the network diameter and average path length, which helps to reduce latency in communications in the network. There may be reduction in wasted bandwidth, due to fewer extra transmissions required (since the average path length is shorter), and thus also a possible decrease in power dissipation. A high radix topology may provide flexibility in terms of re-configurability by removing the need for a physical hierarchy of switches, and may also have strong connectivity and expander graph properties which may enable more efficient use of network resources.

A challenge for practical implementation of existing high radix topologies is related to the complexity of wiring and deployment of the network, which may result in prohibitively high costs. A reason for this complexity is that existing approaches to construct a high radix topology (e.g., Jellyfish topology or Xpander topology) connect nodes using random (or mostly random) connections. While randomness of connections helps to improve average throughput of the network, this randomness means that there is no systematic approach that can be leveraged by operators in deployment and troubleshooting of the network. There also exist approaches that use systematic steps to construct high radix topologies, however such approaches are limited to specific configuration parameters (e.g., specific number of servers, specific radix, specific number of switches, etc.), which limit their practical use.

Figure 1:
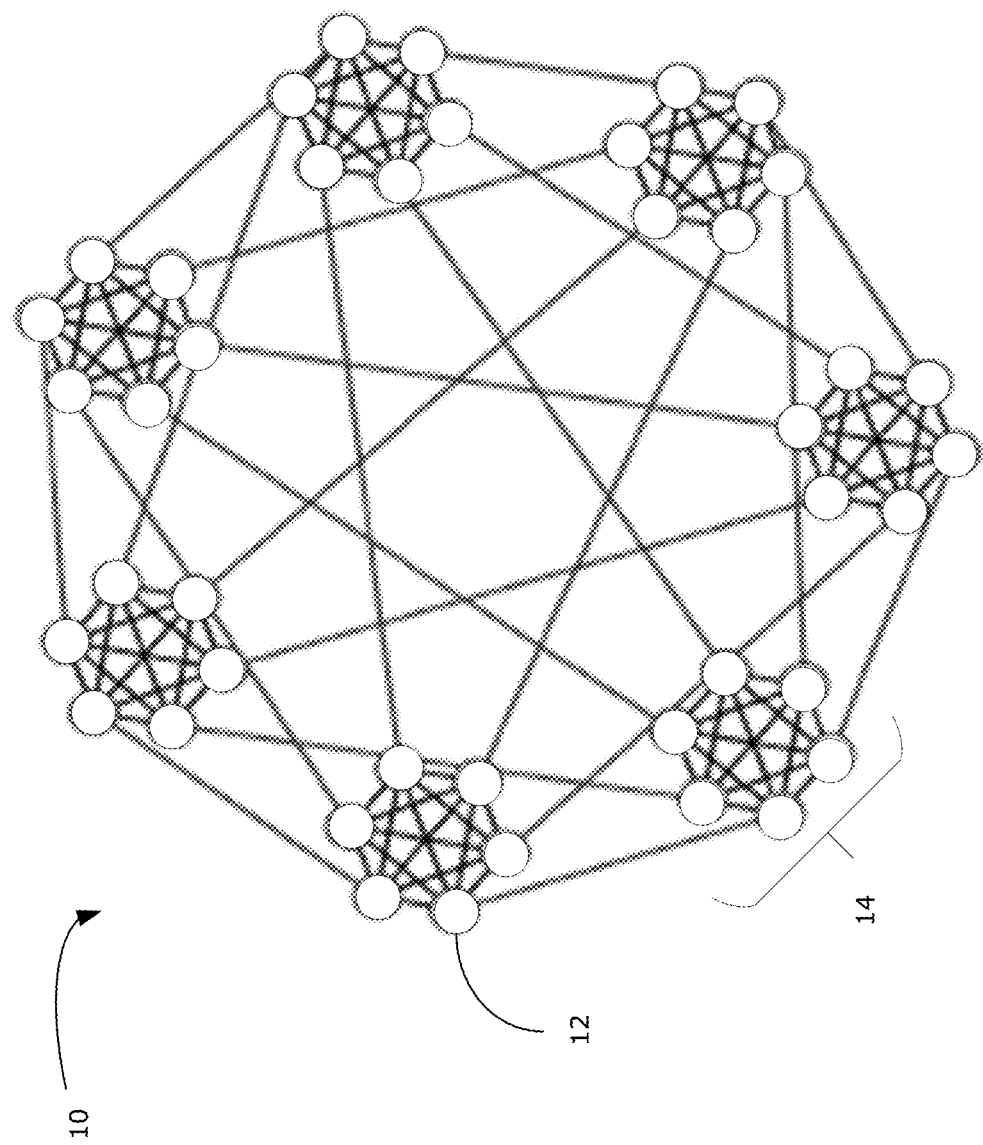
FIG. 1 illustrates an example of a dragonfly high radix topology.

FIG. 1 illustrates an example of a dragonfly topology, which is an example of a high radix topology that is constructed in a systematic way.

The dragonfly topology 10 is an example of an existing high radix topology. As will be discussed herein, the present disclosure enables construction and implementation of various high radix topologies, including existing high radix topologies such as the dragonfly topology 10 as well as other high radix topologies not encompassed by existing approaches to designing high radix topologies.

In the dragonfly topology 10, every node 12 represents a high radix switch (meaning that each switch is capable of supporting a high number of connections (e.g., on the order of ~100 connections)). Each node 12 of is an edge node, meaning that, when implemented as a network, each and every switch has connections to an end point of the network (i.e., there is no intermediary switch that serves only to connect other switches). Every node 12 connects directly to one or more other node 12. Each node 12 is part of a group 14 (or cluster) of nodes 12, where every node 12 is directly connected to every other node 12 belonging to the same group 14. Each group 14 has at least a single connection to each other group 14 (i.e., each group 14 has at least a single node 12 that connects to another node 12 belonging to another group 14).

Although the dragonfly topology 10 provides a structured topology (i.e., without relying on random connections) and thus more easily deployed as a network, the existing approach to constructing a dragonfly topology is only suitable for a limited range of network configuration parameters. Further, the most common topology constructed using the dragonfly approach provides only one connection between different groups 14, which may result in bottlenecks in the deployed network.

Other existing or proposed designs for high radix topologies suffer from various drawbacks as well. For example, fat tree or folded Clos topologies, while structured and relatively easy to deploy, suffers from having a relatively high average path length, particularly for large scale networks. Slimfly topologies and Xpander topologies are limited to a narrow range of network configurations and are difficult to deploy, due to the randomness of construction, which may make such topologies impractical for real-world deployment.

In various examples, the present disclosure describes methods and systems for constructing and implementing a high radix topology that may address at least some of the drawbacks discussed above. The disclosed methods and systems may be applicable to a larger range of network configuration parameters, and the constructed topology may be expandable for deployment of networks having various numbers of switches. Further, the disclosed methods and systems may be more readily deployed in real-world use, due to the use of patterns to connect nodes (and hence less randomness in the connections between switches).

Figure 2A:
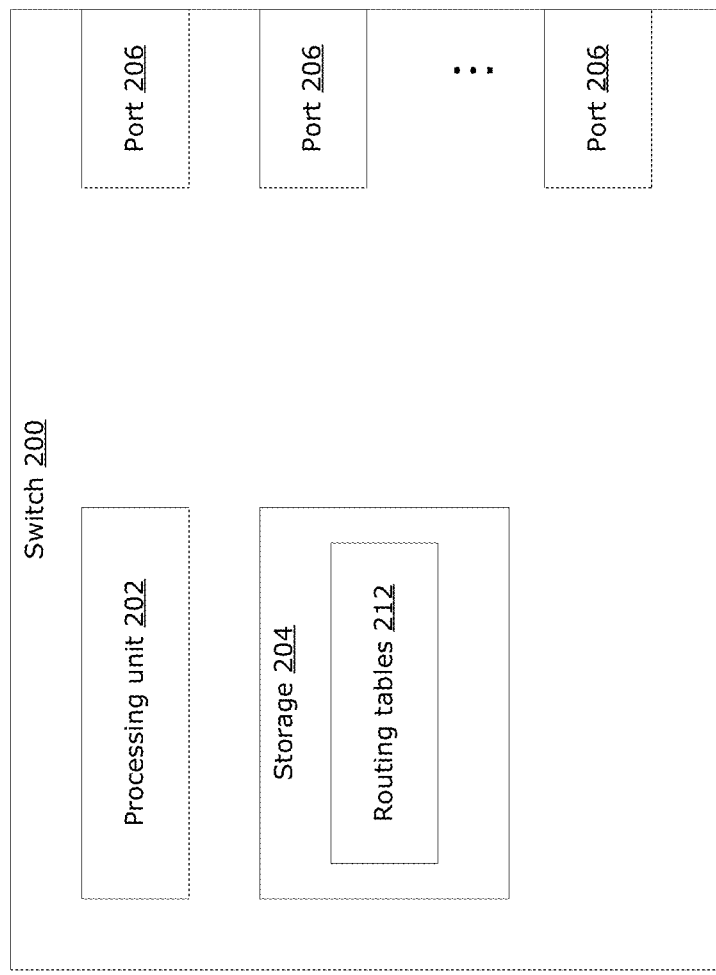
FIG. 2A is a block diagram illustrating an example high radix switch, which may be used to implement a high radix topology in accordance with examples of the present disclosure.
Figure 2B:
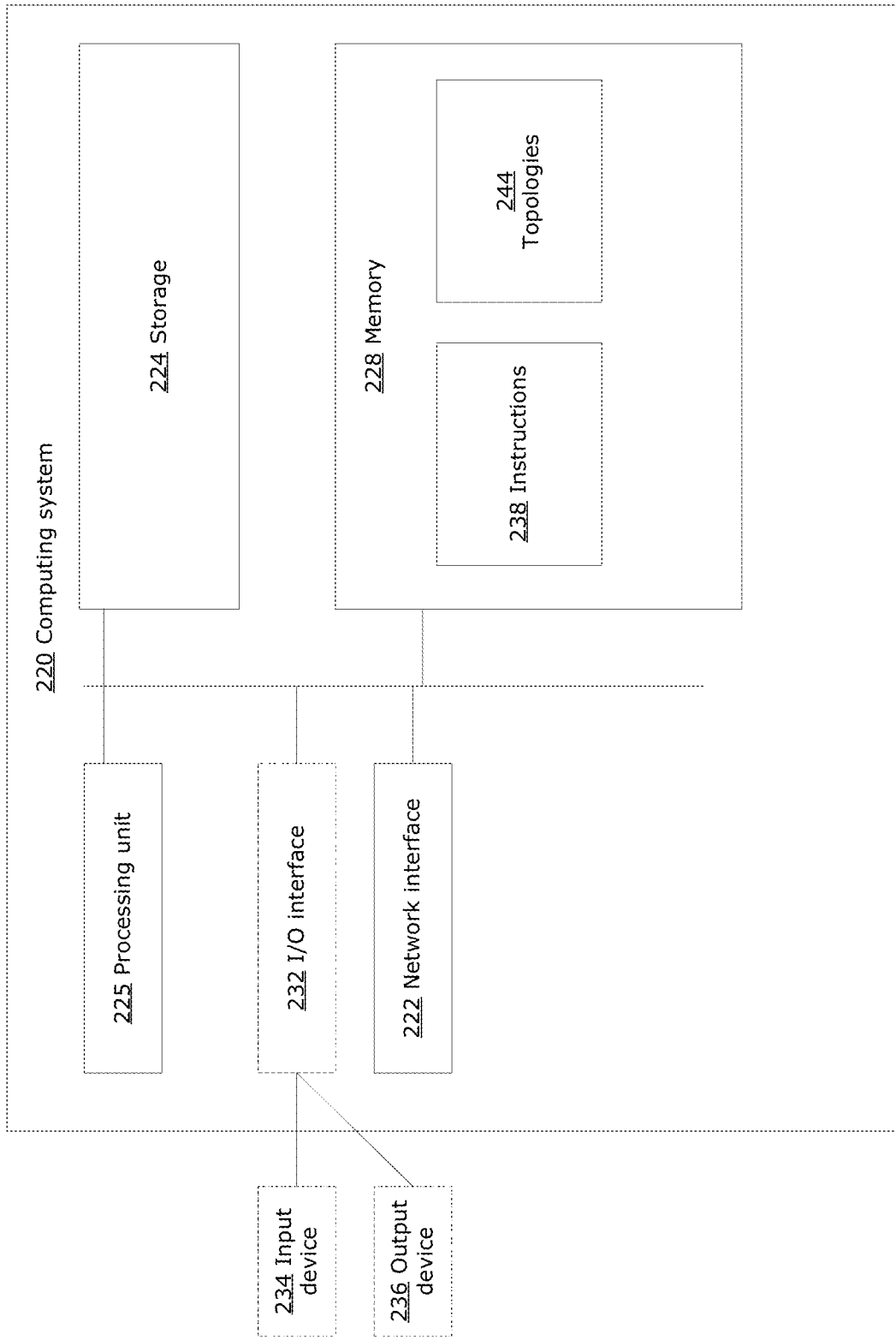
FIG. 2B is a block diagram illustrating an example computing system, which may be used to construct a high radix topology in accordance with examples of the present disclosure.

To assist in understanding the present disclosure, FIGS. 2A and 2B are first discussed.

FIG. 2A is a block diagram illustrating some components of an example switch 200, which may be used to implement a high radix topology. FIG. 2A illustrates a possible embodiment for the switch 200, and is not intended to be limiting.

The example switch 200 includes at least one processing unit 202. The processing unit 202 implements various processing operations of the switch 200. The processing unit 202 includes any suitable processing or computing device, including integrated circuits or chips, configured to perform one or more operations required by the switch 200. The processing unit 202 could, for example, include one or more hardware devices, which may include a microprocessor, microcontroller, digital signal processor, field programmable gate array (FPGA), or application specific integrated circuit (ASIC).

The switch 200 includes at least one storage 204. The storage 204 stores instructions and data used, generated, or collected by the switch 200. In the example shown, the storage 204 stores one or more routing tables 212 (which may contain information for routing outgoing traffic). Instructions and/or modules stored by the storage 204 may be executed by the processing unit 202. The storage 204 may include any suitable register or volatile and/or non-volatile storage and retrieval device(s). The storage 204 may also include any other suitable type of non-transitory memory, such as random access memory (RAM), read only memory (ROM), hard disk, optical disc, and the like.

The switch 200 includes a plurality of ports 206 for receiving incoming traffic and for sending outgoing traffic. In particular, the switch 200 is a high radix switch having a high number of ports 206 (e.g., having ~100 to ~1000 ports 206). A communication link between two switches 200 may comprise a connection (e.g., an optical fiber) between a given port 206 in one switch 200 and a given port 206 in another switch 200.

Multiple switches 200 may be connected to each other to form a network, with the connections being made according to a network topology and in particular a high radix topology. The network topology, according to which the switches 200 should be connected in order to deploy the network, may be constructed according to examples of the present disclosure.

FIG. 2B is a block diagram illustrating a simplified example of a computing system 220, such as a server, a computer or a cloud computing platform, suitable for carrying out examples described herein. For example, the computing system 220 may carry out computations and other operations to construct a high radix topology. Other examples suitable for implementing embodiments described in the present disclosure may be used, which may include components different from those discussed below. Although FIG. 2B shows a single instance of each component, there may be multiple instances of each component in the computing system 220.

The computing system 220 may include at least one processing unit 225, which may include one or more hardware devices, such as a processor, a microprocessor, a digital signal processor, an ASIC, a FPGA, a dedicated logic circuitry, or combinations thereof. The computing system 220 may also include an optional input/output (I/O) interface 232, which may enable interfacing with one or more optional input devices 234 and/or optional output devices 236.

In the example shown, the input device(s) 234 (e.g., a keyboard, a mouse, a microphone, a touchscreen, and/or a keypad) and output device(s) 236 (e.g., a display, a speaker and/or a printer) are shown as optional and external to the computing system 220. In other examples, there may not be any input device(s) 234 and output device(s) 236, in which case the I/O interface 232 may not be needed.

The computing system 220 may include a network interface 222 for wired or wireless communication with one or more other devices or systems over a communication network. The network interface 222 may include wired links (e.g., Ethernet cable) and/or wireless links (e.g., one or more antennas) for intra-network and/or inter-network communications.

The computing system 220 may also include at least one storage unit 224, which may include a mass storage unit such as a solid state drive, a hard disk drive, a magnetic disk drive and/or an optical disk drive.

The computing system 220 may include at least one memory 228, which may include a volatile or non-volatile memory (e.g., a flash memory, a RAM and/or a ROM). The non-transitory memory 228 may store instructions 238 for execution by the processing unit 225, such as to carry out examples described in the present disclosure. In some examples, the memory 228 may include software instructions 238 for execution by the processing unit 225 to implement a method for high radix topology construction as disclosed herein. The software instructions 238 may also include other instructions, such as for implementing an operating system and other applications/functions.

The non-transitory memory 228 may also store topologies 244 that have been generated. The stored topologies 244 may be stored in any suitable data structure and may define how switches 200 should be connected together to form a network.

In some examples, the computing system 220 may additionally or alternatively execute instructions from an external memory (e.g., an external drive in wired or wireless communication with the computing system 220) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

It will be appreciated that various components and operations described herein can be implemented on multiple separate devices or systems in some embodiments.

In various examples, the present disclosure describes an approach to constructing high radix topologies that provides optimal (or close to optimal) connectivity among nodes while minimizing the number of connections. The disclosed examples may enable high radix topologies to be generated with almost any number of nodes having a large range of connectivity, thus enabling more widespread application to networks having various numbers of switches with various radix numbers. The disclosed examples make use of patterns for inter-group and intra-group connections of the topology, which may help to reduce complexity for real-world deployment of the network.

To help in understanding the present disclosure, the concepts of expander graphs and graph lifting are first discussed.

An expander graph is a type of d-regular graph. A d-regular graph is a graph in which every node has d connections (where d is a positive integer). An expander graph has a characteristic that, given the certain number of nodes and a certain number of connections, maximum connectivity is achieved. Put another way, an expander graph is one that achieves a desired level of connectivity (which results in path diversity, which in turn results in a more robust network when deployed) using fewer (or fewest) connections. A Ramanujan graph are a type of expander graph that is commonly considered to be an optimal expander graph.

Graph lifting is a technique that has been used to construct expander graphs (including Ramanujan graphs). Graph lifting starts with a base graph (which may be a Ramanujan graph if a larger Ramanujan graph is being constructed) that is replicated a number of times (referred to as the lift number). Each replica may be referred to as a fiber, however to avoid confusion with physical fibers (e.g., optical fibers) used in deployment of a network, the present disclosure will use the term "group" to refer to each replica. The nodes of a given group are connected to each other by intra-group connections. In order to connect the groups to each other and thus form a larger graph, some of the intra-group connections are selected to form inter-group connections instead. This means that, instead of connecting a source node to a destination node within the same group, a connection is made from the source node in a source group to a replica of the destination node in a different group.

Figure 3:
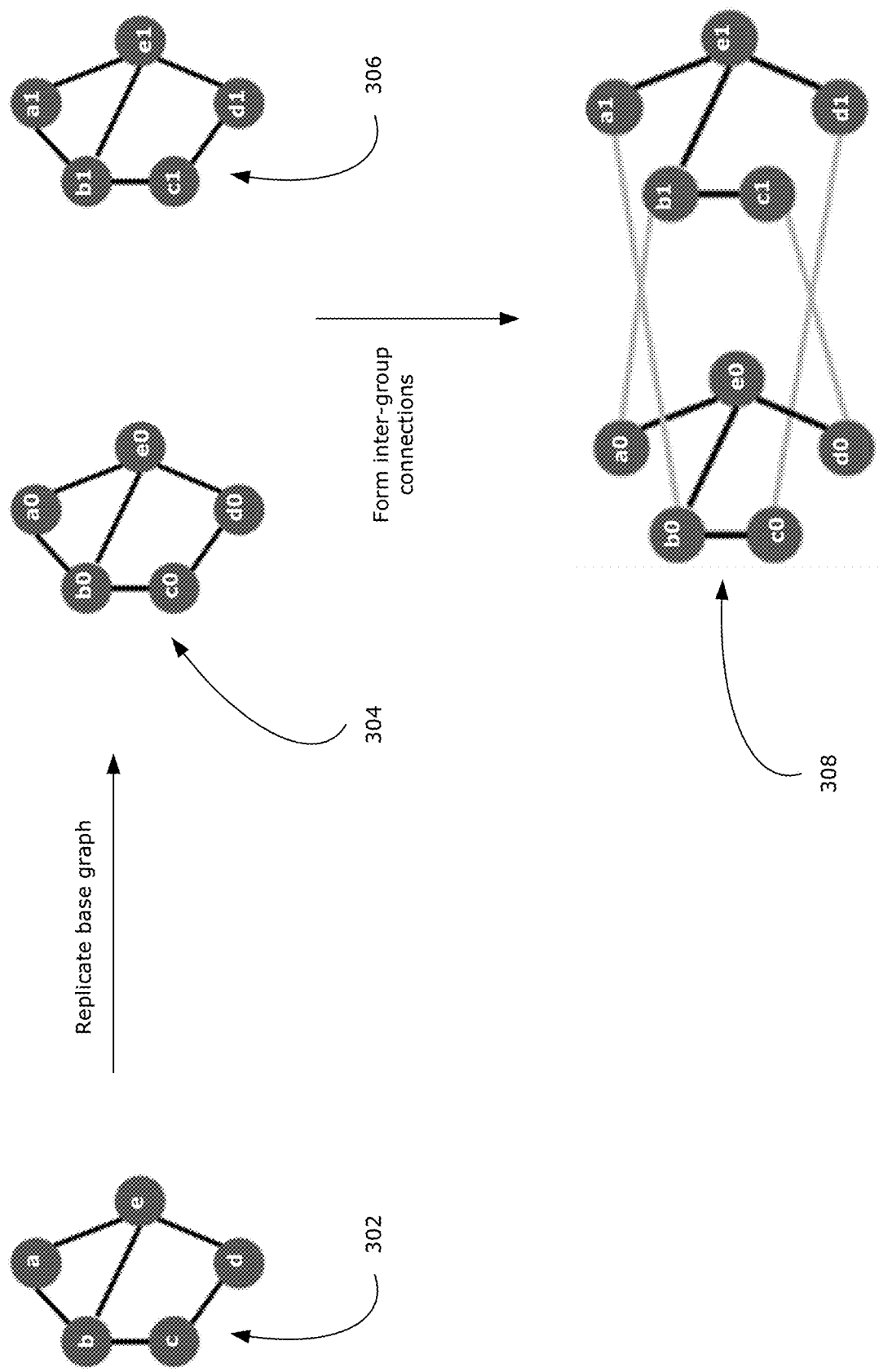
FIG. 3 illustrates an example of a graph lifting technique, in accordance with examples of the present disclosure.

FIG. 3 illustrates a simple example of graph lifting. In this example, the lift number is two, thus this example may be referred to as an example of 2-lifting.

The graph lifting starts with a base graph 302. The base graph 302 is replicated two times (i.e., the lift number is two) into two groups 304, 306. Notably, each group 304, 306 has the same number of nodes and same connections between nodes as the base graph 302. Specifically, nodes a to e and their connectivity in the base graph 302 are replicated as nodes a0 to e0 with corresponding connectivity in the first group 304 and as nodes a1 to e1 with corresponding connectivity the second group 306. Each intra-group connection connects a source node and a destination node within the same group. In order to connect the groups 304, 306 to each other and thus form a larger graph 308, some of the intra-group connections are selected to form inter-group connections instead. This means that, instead of connecting a source node to a destination node within the same group, the connection is changed so that a source node in a source group is connected to a destination node in a different destination group. In the graph lifting technique, the same intra-group connections are selected in each group 304, 306 to form inter-group connections by changing the destination node of each intra-group connection to a corresponding destination node in a different group. For example, the a0-b0 intra-group connection in the first group 304 is selected to form inter-group connection a0-b1; and the a1-b1 intra-group connection in the second group 306 is selected to form inter-group connection a1-b0. Similarly, the c0-d0 and c1-d1 intra-group connections are selected to form c0-d1 and c1-d0 inter-group connections.

A challenge with existing graph lifting techniques is that it is difficult or computationally impossible (in real-world applications) to ensure that the inter-group connections are properly selected to ensure high connectivity (e.g., to ensure connectivity that is close to that of a Ramanujan graph) while being suitable for real-world deployment (e.g., too much randomness in the connections of the deployed network can be impractical for real-world trouble-shooting). The present disclosure describes methods and systems for constructing a high radix topology that can be characterized as an expander graph, using the graph lifting technique and using a presently disclosed technique for constructing the inter-group connections. The constructed topology may be a Ramanujan graph or has properties close to those of a Ramanujan graph (e.g., connectivity, as measured by spectral gap of the connectivity matrix, is close to that of a Ramanujan graph).

Examples of the present disclosure may enable construction of a network topology that has some degree of randomness, to help improve connectivity of the deployed network, but not so random that real-world deployment is impractical. In the present disclosure, a plurality of permutations matrices are generated, each of which represents a pattern for constructing inter-group connections. Randomness is introduced in how these permutation matrices (which may be simply referred to as patterns) are used to construct the inter-group connections. In this way, randomness is introduced while still maintaining an amount of regularity because there is a finite and known set of permutation matrices. In some examples, a selectable parameter may enable a user (e.g., a designer of the network topology) to control the portion of connections that are inter-group connections, thus enabling control over locality of node groups in the topology.

Figure 4:
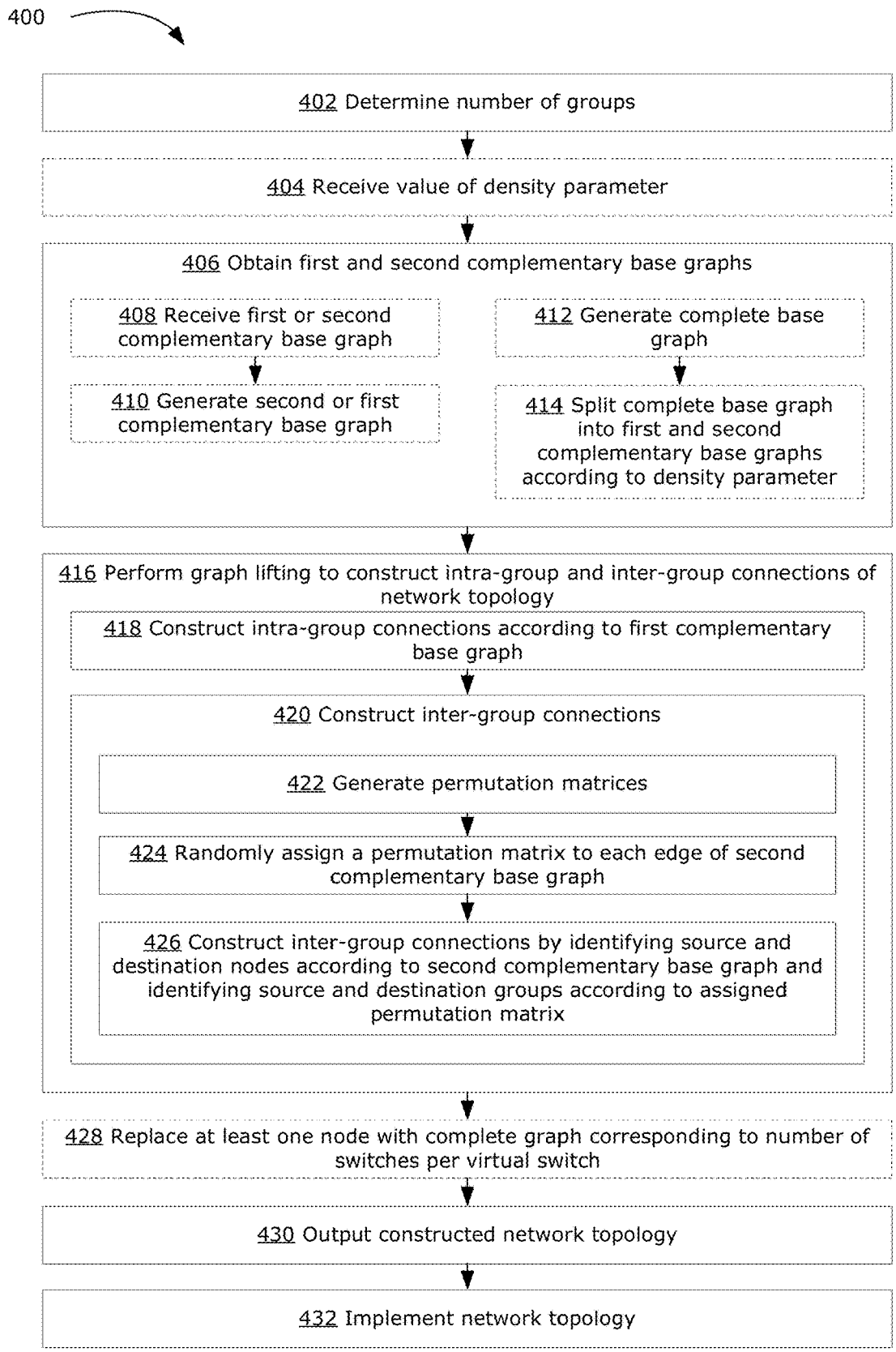
FIG. 4 is a flowchart of an example method for generating and implementing a high radix network topology, in accordance with examples of the present disclosure.

FIG. 4 is a flowchart illustrating an example method 400 for constructing and implementing a network topology, include a high radix topology. The method 300 may be carried out by using a computing system (e.g., the computing system 220 of FIG. 2B) to construct the network topology. The network topology may be implemented as a physical network by connecting switches (e.g., switches 200 of FIG. 2A) according to the inter-group and intra-group connections of the network topology. To assist in understanding the method 400, reference may be made to FIGS. 5A-5D, which illustrate a simple example implementation of the method 400.

At 402, the number of groups (i.e., the number of groups into which the nodes of the topology are distributed) for the topology is determined. The number of groups defines the lift number that will be used to generate the topology from a base graph, using a graph lifting technique.

The number of groups may be determined based on the predefined configuration parameters of the network, such as the number of servers (or end points) to be connected by switches, the radix (i.e., number of available ports) of the switches, and the server port ratio (i.e., the ratio representing what proportion of switch ports should be connected to servers as opposed to other network connections). Each of these parameters may be predefined by a user and/or predefined based on real-world requirements.

The number of groups may be determined to ensure that the number of servers is sufficiently connected by the switches according to the server port ratio, for example using the following equations:

$$F_n = N_s / (d+1)$$
$$d = R_s(1-\alpha)$$
$$N_s = \left\lceil \frac{X}{\alpha R_s} \right\rceil$$

where $F_n$ denotes the number of groups (or the lift number), $N_s$ denotes the number of switches required for the network, d denotes the required degree of the nodes (i.e., the number of edges connected to each node) in the topology, $R_s$ denotes the radix of the switches (where all switches have the same radix), a denotes the server port ratio, and X denotes the number of servers. In this way, the number of groups, denoted $F_n$ in the above equation, may be determined.

In some examples, the number of groups may be determined based on user input (e.g., input from a designer of the network topology). For example, the number of groups may be a numerical parameter that can be directly inputted. In another example, the number of groups may be indirectly inputted, for example by the user inputting the total number of nodes and the number of nodes in each group. If the number of nodes in each group (also referred to simply as group size, denoted |s'|) is provided by the user, the system may reject any group size that does not satisfy the following conditions:

condition 1: $|s|-1 \geq ((1-a)R_s-H$ condition 2: $|s| \times (R_s-H)$ is even where H denotes the number of ports used for intra-group connectivity in each switch. If the intra-group topology is provided by the user (e.g., user inputs the first complementary base graph at step 408 below), then H is determined according to the intra-group connectivity of the intra-group topology.

Satisfying condition 1 guarantees that the number of inter-group connections for a given group is not larger than the maximum degree of a node in a complete graph of size |s|. Satisfying condition 2 guarantees that there exists a connected regular graph (i.e., where every node has the same degree) of degree $(R_s-H)$ having |s| nodes. Assuming the above conditions are satisfied by the user-inputted group size, then the number of groups may be determined by computing:

$$F_n = N_s/|s|$$

Optionally, at 404, a value for a density parameter may be received. The density parameter is a controllable parameter that can be used to adjust the proportion of inter-group connectivity versus intra-group connectivity (also referred to as global connectivity versus local connectivity). As will be discussed further below, the density parameter may be used to generate the second complementary base graph that is used to determine the inter-group connections.

In examples of the present disclosure, the density parameter may be a global link density parameter in which a higher value for the density parameter means more inter-group connectivity versus intra-group connectivity. The density parameter (denoted p) may have a value in the range 0<p<1. At one extreme, if the density parameter is set equal to 1, this means that all connections are used for inter-group connections with no local connectivity within each group; at the other extreme, if the density parameter is set equal to 0, this means that all connections are used for intra-group connections with no global connectivity between groups. Typically, these two extremes should be avoided for practical applications. It should be understood that in other examples, the density parameter may be a local link density parameter in which a higher value for the density parameter means more intra-group connectivity versus inter-group connectivity.

In some examples, step 404 may be omitted and the value of the density parameter may be set to a default value (e.g., p=0.5). In other examples, the density parameter may not be needed (e.g., if the user provides the first or the second complementary base graph) and step 404 may be omitted and no value may be set for the density parameter.

At 406, first and second complementary base graphs are obtained. The first and second complementary base graphs are complementary to each other, meaning that when the first and second complementary base graphs are combined, the result is a complete graph (i.e., a graph in which every node is connected to every other node). This means that the first and second complementary base graphs have the same number of nodes and no overlapping edges. Further, every node in the first complementary base graph maps to a corresponding node in the second complementary base graph. The first complementary base graph will be used to construct the intra-group connections and the second complementary base graph will be used to construct the inter-group connections. Step 406 may be performed using steps 408 and 410, or using steps 412 and 414, for example.

If 408 and 410 are performed, then at 408 the first or second complementary base graph is received. For example, the user may input a base graph to use as the first or second complementary base graph. The inputted base graph defines the number of nodes in a group, thus the inputted base graph should have a size that satisfies the conditions described above. Additionally, the base graph should be a regular graph, to ensure symmetry of the network. The user may specify whether the inputted base graph is to be used as the first complementary base graph (i.e., to be used for intra-group connections) or as the second complementary base graph (i.e., to be used for inter-group connections). By default, it may be assumed that a user-inputted base graph is intended to be the second complementary base graph (i.e., to be used for inter-group connections).

At 410, the second or first complementary base graph is generated to be complementary to base graph received at step 408. That is, if the first complementary base graph is received at step 408, then the second complementary base graph is generated at step 410. Conversely, if the second complementary base graph is received at step 408, then the first complementary base graph is generated at step 410.

Alternatively, if the user does not supply a base graph, steps 412 and 414 may be performed. At 412, a complete base graph is generated. The complete base graph should have a graph size (i.e., number of nodes) that satisfies the required degree of the nodes d, as computed according to the equation $d=R_s(1-a)$ described above. Since the generated base graph is a complete graph (meaning that every node is connected to every other node), this means that the complete base graph must have a size of d+1.

Figure 5A:
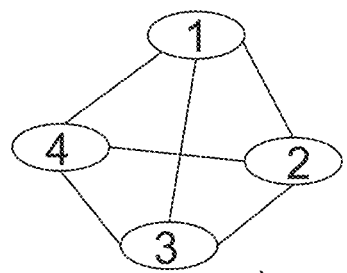
FIGS. 5A-5D illustrate an example implementation of the method of FIG. 4.
Figure 5A:
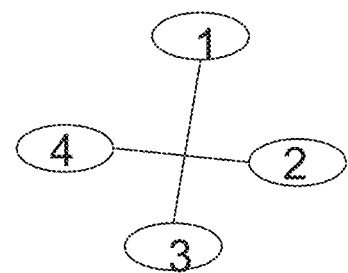
Figure 5A:
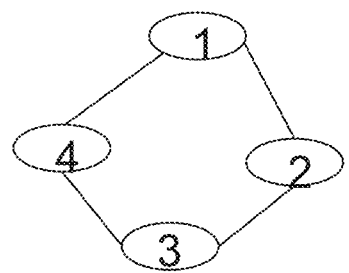

For example, FIG. 5A shows the simple example of a complete base graph 502 having a degree of 3 (i.e., every node has three connections), and therefore the number of nodes is 3+1=4.

At 414, the complete base graph is split into first and second complementary base graphs according to the density parameter. If the density parameter is a global link density parameter that controls the inter-group connectivity, then the degree of the second complementary base graph may be defined to be $d_2=\lceil p(d) \rceil$ where $d_2$ denotes the degree of the second complementary base graph. The second complementary base graph is the regular graph having degree equal to $d_2$, and the first complementary base graph is the regular graph having degree $d_1$, such that $d_1+d_2=d$ (i.e., the first and second complementary base graphs when combined together result in the complete base graph of degree d).

In the example of FIG. 5A, the complete base graph 502 is split into a first complementary base graph 504 having degree of 1, and a second complementary base graph 506 having degree of 2. This may be the result of a density parameter having a value greater than 0.33. As can be seen from FIG. 5A, the first and second complementary base graphs 504, 506 have corresponding nodes (numbered 1 to 4) and can be combined to obtain the complete base graph 502, without any overlapping edges.

Having obtained the first and second complementary base graphs, the method 400 proceeds to step 416 to construct the intra-group and inter-group connections of the network topology, using graph lifting.

At 418, the intra-group connections are constructed according to the first complementary base graph. Specifically, the first complementary base graph is replicated a number of times equal to the number of groups determined at step 402. Each replica is then a group of nodes that map to the nodes of the first complementary base graph and having intra-group connections that map to the edges of the first complementary base graph. Notably, following step 418 the groups lack inter-group connectivity.

Figure 5B:
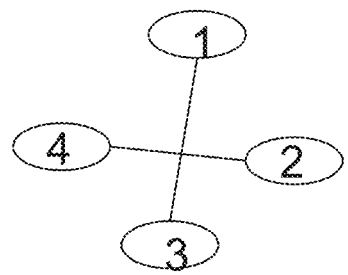
Figure 5B:
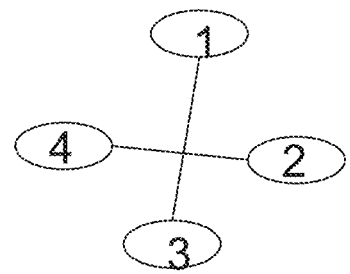
Figure 5B:
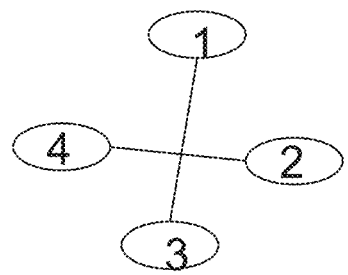

FIG. 5B illustrates the simple example in which the first complementary base graph 504 of FIG. 5A is used to construct intra-group connections. In this example, the number of groups (or lift number) is three. Thus, the first complementary base graph 504 is used to construct the intra-group connections for three groups of nodes, namely group-1 512, group-2 514 and group-3 516. The nodes of the groups 512, 514, 516 are numbered 1 to 4 to illustrate how the nodes of each group 512, 514, 516 map to the nodes of the first complementary base graph 504. It can be appreciated that there is no inter-group connectivity among the groups 512, 514, 516.

At 420, the inter-group connections are constructed by performing steps 422 to 426.

At 422, a set of permutation matrices is generated. Each permutation matrix represents a pattern for selecting a source group and a destination group for each respective inter-group connection of each group. That is, if each inter-group connection is considered to originate from a source group and connect the source group to a different destination group, then the permutation matrix represents the pattern that is used to identify the destination group of each inter-group connection. Mathematically, a permutation matrix represents a function that maps every element in a set (in this case, the groups of the topology) to a same or different element within the same set. Each permutation matrix in the generated set is a square binary matrix having a dimension equal to the number of groups. In the case of the constructed inter-group connections, a permutation matrix represents the pattern that maps every source group to a different destination group in the same topology. Every row and every column of the permutation matrix has only one non-zero entry. The (i,j) entry of the permutation matrix is a binary value indicating whether the ith group is to be connected to the jth group (e.g., a value of 1 indicates that the inter-group connection should be constructed between these groups; a value of 0 indicates that there is no inter-group connection).

In the present disclosure, not all possible permutation matrices are included in the generated set. As can be appreciated, there are some permutation matrices that do not provide a desired inter-group connectivity. For example, the identity matrix is a permutation matrix that connects each group to itself (i.e., no inter-group connections are formed), which is clearly undesirable. The present disclosure provides example criteria for selecting suitable permutation matrices to result in a final constructed topology that is a Ramanujan graph or close to a Ramanujan graph.

In the present disclosure, two permutation matrices are considered to be overlapping if the two matrices have at least one identical row (or column) at the same position (i.e., at the same row (or column) index). This overlap means that the two matrices represent patterns in which the same source group is connected to the same destination group. In the present disclosure, one selection criterion is that there should not be any overlapping of the permutation matrices in the generated set. By having no overlap in the set of permutation matrices, this helps to ensure that inter-group connections are distributed among the nodes without redundancy (i.e., there is no inter-group connection that duplicates another existing connection between two nodes).

In the present disclosure, a permutation matrix that has a row (or column) that overlaps with the identity matrix is referred to as a fixed row or fixed column matrix (note that the identity matrix is itself a fixed row or fixed column matrix). In the present disclosure, another selection criterion is that there should not be any permutation matrix with a fixed row or fixed column in the generated set. A fixed row or fixed column represents a connection that connects a group to itself (i.e., does not connect the source group to a different destination group) and thus would not be suitable for constructing inter-group connections.

An example of permutation matrices that satisfy the above selection criteria are circular permutation matrices. Circular permutation matrices are the result of circular shifting each row of an identity matrix by positive integer. Thus, at step 422, a set of suitable permutation matrices may be generated by applying different amounts of circular shifting to an identity matrix having dimension equal to the number of groups. It should be noted that, if the number of groups is K, then there will be (K-1) unique permutation matrices generated.

Figure 5C:
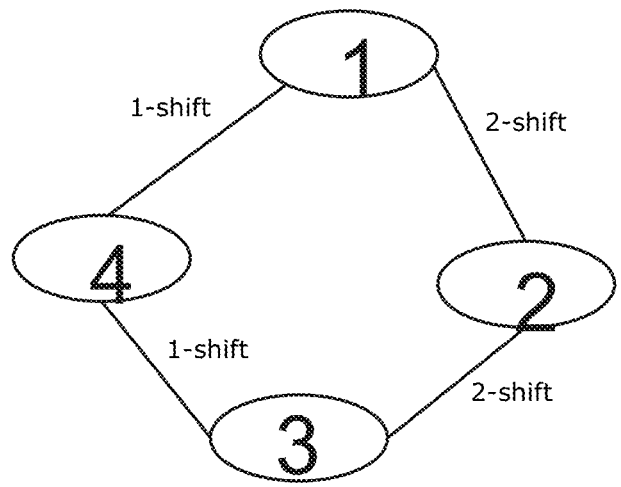

FIG. 5C illustrates a simple example of step 422. This example follows from the examples of FIGS. 5A and 5B. As shown in table 520, a set of two permutation matrices has been generated by applying a circular shift to the identity matrix having a dimension of three (since there are three groups to be connected). Specifically, a 1-shift permutation matrix (i.e., circular shifting the rows of the identity matrix by one) and a 2-shift permutation matrix (i.e., circular shifting the rows of the identity matrix by two) are shown, with the respective inter-group pattern each represents. For example, the 1-shift permutation matrix represents the inter-group pattern where group-1 connects to group-2, group-2 connects to group-3, and group-3 connects to group-1. It should be appreciated that because circular shifting is used to generate the set of permutation matrices, there is a maximum of two permutation matrices when there are three groups.

Although circular permutation matrices are examples of permutation matrices that are suitable and that satisfy the selection criteria discussed above, it should be understood that these are only examples. Any other set of permutation matrices that does not include overlapping matrices and does not include matrices with fixed row or fixed column may be generated at step 422. In some examples, the set of permutation matrices may be generated using a function or algorithm (e.g., as in the case of the circular permutation matrices) or may be predefined and generated by retrieving from memory (e.g., a suitable set of permutation matrices for construction inter-group connections for a known number of groups may be predefined and stored in memory).

At 424, one permutation matrix from the set of permutation matrices is randomly assigned to each edge of the second complementary base graph. The assignment of permutation matrices to edges of the second complementary base graph may be performed in a manner that helps to ensure the permutation matrices are assigned in a balanced manner. This means that the number of times each permutation matrix has been assigned to an edge should be uniform or close to uniform across the set of permutation matrices. For example, one permutation matrix may be assigned to each edge by, for each given edge, randomly sampling the set of permutation matrices according to a uniform distribution and assigning the randomly sampled permutation matrix to that given edge. This approach to assigning the permutation matrices may help to ensure that the resulting topology is balanced, meaning that there is relatively even connectivity among the groups (i.e., there is no pair of groups that are overly connected to each other compared to other groups).

The bottom diagram of FIG. 5C illustrates a simple example of step 424. In this example, one permutation matrix (as indicated by "1-shift" or "2-shift") from the set of permutation matrices shown in table 520 has been randomly assigned to each edge of the second complementary base graph 506.

At 426, inter-group connections are constructed according to the second complementary base graph and the permutation matrices assigned to respective edges of the second complementary base graph. Specifically, an inter-group connection may be constructed by first identifying a source node and a destination node corresponding to a selected edge of the second complementary base graph. Then, using the permutation matrix assigned to the selected edge, a source group and a destination group are identified. Finally, an inter-group connection is constructed by the source node in the source group to the destination node in the destination group.

As noted above, each node of the second complementary base graph corresponds to a respective node of the first complementary base graph, and each node in a group (connected by intra-node connections constructed at step 418) maps to a node of the first complementary base graph. This means that each node of a group also maps to a node of the second complementary base graph. Accordingly, the source and destination nodes identified in the second complementary base graph maps to source and destination nodes in each group. That is, a source node and a destination node can identified in each group. It is these nodes that will be connected by the constructed inter-group connections. The source group (identified using the permutation matrix) is then connected to the destination group (also identified using the permutation matrix) by connecting the source node within the source group to the destination node within the destination group.

Since the permutation matrix represents a pattern for connecting all the groups, this process is repeated until all groups have been connected according to the pattern. This completes the construction of inter-group connections for source and destination nodes identified from one edge of the second complementary base graph. It should be understood that although the inter-group connections are described as being constructed from a source node to a destination node and from a source group to a destination group, the inter-group connections may be bidirectional connections, and traffic in the communication links corresponding to the constructed inter-group connections may be bidirectional.

Figure 5D:
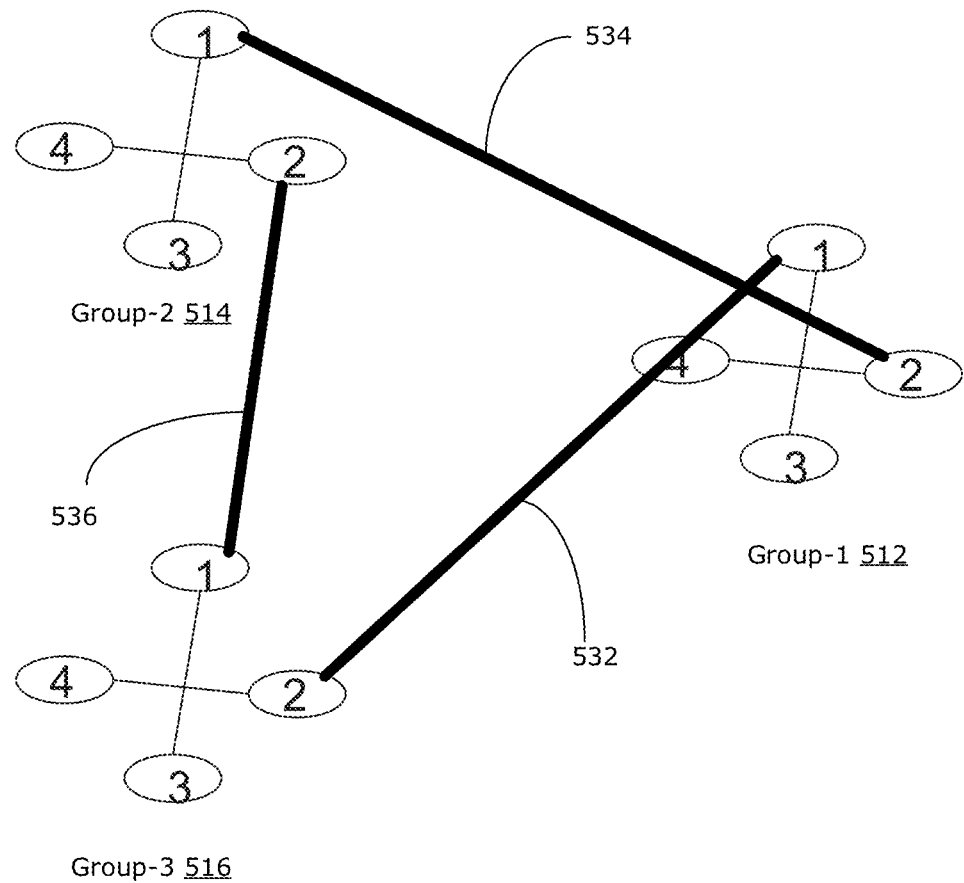

FIG. 5D follows from the examples of FIGS. 5A-5C. FIG. 5D illustrates a simple example of how some inter-group connections may be constructed at step 426. In this example, the 1-2 edge (i.e., the edge connected node1 to node2) of the second complementary base graph 506 has been selected. Thus, inter-group connections are constructed from node1 of each group 512, 514, 516 to node2 of a different group 512, 514, 516. The source group and destination group of each inter-group connection are identified based on the permutation matrix assigned to the 1-2 edge of the second complementary base graph 506. As shown in FIG. 5C, the 2-shift permutation matrix has been assigned to the 1-2 edge. The 2-shift permutation matrix and the inter-group pattern it represents are shown in table 520. According to this permutation matrix, the inter-group connections that are based on the 1-2 edge of the second complementary base graph 506 should connect group-1 512 to group-3 516, group-2 514 to group-1 512, and group-3 516 to group-2 514. These inter-group connections are shown in FIG. 5D using thicker lines. As seen in FIG. 5D, a first inter-group connection 532 is constructed that connects node1 in group-1 512 to node2 in group-3 516; a second inter-group connection 534 is constructed that connects node1 in group-2 514 to node2 in group-1 512; and a third inter-group connection 536 is constructed that connects node1 in group-3 516 to node2 in group-2 514.

The process is repeated to construct inter-group connections based on for source and destination nodes identified from all remaining edges of the second complementary base graph.

In this way, all intra-group connections and inter-group connections of the network topology may be constructed. The result is a topology that is at least close to Ramanujan graphs in connectivity.

In some examples, a node in the topology may represent a virtual switch that stands in for multiple switches. This may be the case where the switch hardware does not provide a high enough radix, for example. In such examples, optional step 428 may be performed.

At optional step 428, at least one node (which represents a virtual switch) is replaced with a complete graph that has a number of nodes equal to the number of switches represented by the virtual switch.

At 430, the constructed network topology is outputted. The network topology may be outputted in various ways, for example as a graph representation, as a list of nodes and their connections, as a table, etc.

At 432, the network topology is implemented. Outputting the network topology may cause the network topology to be implemented using hardware. In this way, the method 400 may be physically embodied in a real-world application. As mentioned above, the network topology may be implemented using hardware, such as physical switches and communication links. In this way, a high radix network can be deployed.

The methods and systems disclosed herein may help to address some drawbacks of existing approaches for designing a high radix network, as discussed previously. Unlike some existing network designs, such as the dragonfly network, the examples disclosed herein may be suitable for generating a topology for a network having any arbitrary number of nodes. Some existing approaches use a random structure to provide path diversity, which may cause difficulties in real-world deployment. In the methods and systems disclosed herein, the amount of randomization is reduced by using a predefined set of permutation matrices (representing relatively simple connection patterns) and quasi-randomly assigning these permutation matrices to construct inter-group connections. As a result, the generated topology is based on a finite number of known patterns (which may be easier to deploy), while maintaining the benefits of randomness in introducing path diversity (which may be useful for routing and load balancing purposes). Another drawback of some existing approaches, such as Slimfly and Xpander, is that it is difficult or impossible for a user to control relative local/global connectivity, meaning the user is not able to directly control the local or global behavior of the network. In the methods and systems disclosed herein, the user may select the value of a density parameter, which controls the relative local/global connectivity of the generated topology. Other ways for the user to have more control over the local and global behavior of the network include enabling the user to provide the first or second complementary base graph.

It should be noted that, the disclosed methods and systems may be suitable for constructing topologies even where there is no preference regarding grouping or intra-group connectivity. For example, if the user does not provide the first or second complementary base graph and does not specify the desired number of nodes in a group, a complete base graph may be generated that is the largest complete graph possible using the available number of ports per switch. This may be useful in some scenarios where global connectivity is the main focus of the network, and thus the topology may be generated in a way to optimize global connectivity.

In various examples, the present disclosure has described methods and systems for generating and implementing a high radix network topology. Compared to some existing multi-stage topology designs (e.g., Clos network or butterfly network), the present disclosure enables reduction in the mean path length, which may help to reduce the latency in the deployed network. The generated topology has optimal or close to optimal connectivity, and is not limited to any specific number of nodes. The disclosed approach supports scaling of the network, and introduces the use of defined permutation matrices to reduce complexity for real-world deployment and troubleshooting.

The examples disclosed herein enable user control over intra- and inter-group connectivity (e.g., though user input of a density parameter, user input of a desired group size, or user input of a first or second complementary base graph). This enables greater customization of the network topology, for example to accommodate an expected or known traffic pattern. The topology may be readily reconfigurable and adapted to different traffic patterns.

The topology is generated with all nodes and connections at the same level (rather than being hierarchy-based, for example). Thus, the traffic in the deployed network may be more uniformly distributed, and the chance of congestion may be reduced. As well, the topology may be robust to switch and link failures as there is no central link or switch that has a more important role in the network.

Although described in the context of a high radix network, examples disclosed herein may be suitable for generating and implementing other topologies. For example, the disclosed approach may be useful for connecting any network where the latency of communication between nodes is important (e.g., high performance computing clusters).

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for constructing a network topology for a high radix network, nodes of the network topology corresponding to high radix switches of the high radix network, the method comprising:
   determining a number of groups into which the nodes of the network topology are divided;
   obtaining a first complementary base graph and a second complementary base graph, wherein the first and second complementary base graphs are complementary to each other and combine to form a complete graph;
   constructing intra-group connections of the network topology by connecting the nodes of each group according to the first complementary base graph;
   constructing inter-group connections of the network topology by:
      generating a plurality of permutation matrices, each permutation matrix representing a pattern for selecting a source group and a destination group for each respective inter-group connection of each group; and
      randomly selecting one permutation matrix to assign to each edge of the second complementary base graph;
      wherein an inter-group connection is constructed by identifying a source node and a destination node corresponding to a selected edge of the second complementary base graph, identifying a source group and a destination group according to the permutation matrix assigned to the selected edge, and connecting the source node in the source group to the destination node in the destination group; and
   outputting the constructed topology to be implemented in the high radix network.

2. The method of claim 1, wherein the number of groups is computed based on predefined configuration parameters of the high radix network.

3. The method of claim 1, wherein obtaining the first complementary base graph and the second complementary base graph comprises receiving one of the first complementary base graph or the second complementary base graph, and generating the other of the first complementary base graph or the second complementary base graph.

4. The method of claim 1, wherein obtaining the first complementary base graph and the second complementary base graph comprises:
   receiving a value for a density parameter representing relative inter-group connectivity compared to intra-group connectivity;
   generating the second complementary base graph based on the density parameter; and generating the first complementary base graph to be complementary to the second complementary base graph.

5. The method of claim 1, wherein there is no overlap of any row or any column between any pair of permutation matrices in the plurality of permutation matrices, and wherein none of the permutation matrices contain any row or any column that overlaps with an identity matrix.

6. The method of claim 1, wherein each permutation matrix is a square matrix having dimensionality equal to the number of groups.

7. The method of claim 6, wherein generating the plurality of permutation matrices comprises:
generating each permutation matrix by applying a respective amount of circular shift to an identity matrix having dimensionality equal to the number of groups;
wherein each permutation matrix is generated by a respective different amount of circular shift and each permutation matrix is unique in the plurality of permutation matrices.

8. The method of claim 1, wherein a plurality of high radix switches are represented by at least one virtual switch, and wherein at least one node of the constructed topology corresponds to the at least one virtual switch and is implemented using the plurality of high radix switches.

9. The method of claim 8, further comprising:
prior to outputting the constructed topology, replacing the at least one node corresponding to the at least one virtual switch with a complete graph having a number of nodes equal to a number of switches represented by the at least one virtual switch.

10. A computing system for constructing a network topology for a high radix network, nodes of the network topology corresponding to high radix switches of the high radix network, the computing system comprising:
a processing unit configured to execute instructions to cause the computing system to:
determine a number of groups into which the nodes of the network topology are divided;
obtain a first complementary base graph and a second complementary base graph, wherein the first and second complementary base graphs are complementary to each other and combine to form a complete graph;
construct intra-group connections of the network topology by connecting the nodes of each group according to the first complementary base graph;
construct inter-group connections of the network topology by:
generating a plurality of permutation matrices, each permutation matrix representing a pattern for selecting a source group and a destination group for each respective inter-group connection of each group; and
randomly selecting one permutation matrix to assign to each edge of the second complementary base graph;
wherein an inter-group connection is constructed by identifying a source node and a destination node corresponding to a selected edge of the second complementary base graph, identifying a source group and a destination group according to the permutation matrix assigned to the selected edge, and connecting the source node in the source group to the destination node in the destination group; and
output the constructed topology to be implemented in the high radix network.

11. The computing system of claim 10, wherein the number of groups is computed based on predefined configuration parameters of the high radix network.

12. The computing system of claim 10, wherein the processing unit is configured to execute instructions to cause the computing system to obtain the first complementary base graph and the second complementary base graph by receiving one of the first complementary base graph or the second complementary base graph, and generating the other of the first complementary base graph or the second complementary base graph.

13. The computing system of claim 10, wherein the processing unit is configured to execute instructions to cause the computing system to obtain the first complementary base graph and the second complementary base graph by:
receiving a value for a density parameter representing relative inter-group connectivity compared to intra-group connectivity;
generating the second complementary base graph based on the density parameter; and
generating the first complementary base graph to be complementary to the second complementary base graph.

14. The computing system of claim 10, wherein there is no overlap of any row or any column between any pair of permutation matrices in the plurality of permutation matrices, and wherein none of the permutation matrices contain any row or any column that overlaps with an identity matrix.

15. The computing system of claim 10, wherein each permutation matrix is a square matrix having dimensionality equal to the number of groups.

16. The computing system of claim 15, wherein the processing unit is configured to execute instructions to cause the computing system to generate the plurality of permutation matrices by:
generating each permutation matrix by applying a respective amount of circular shift to an identity matrix having dimensionality equal to the number of groups;
wherein each permutation matrix is generated by a respective different amount of circular shift and each permutation matrix is unique in the plurality of permutation matrices.

17. The computing system of claim 10, wherein a plurality of high radix switches are represented by at least one virtual switch, and wherein at least one node of the constructed topology corresponds to the at least one virtual switch and is implemented using the plurality of high radix switches.

18. The computing system of claim 17, wherein the processing unit is configured to execute instructions to cause the computing system to:
prior to outputting the constructed topology, replace the at least one node corresponding to the at least one virtual switch with a complete graph having a number of nodes equal to a number of switches represented by the at least one virtual switch.

19. A non-transitory computer readable medium for constructing a network topology for a high radix network, nodes of the network topology corresponding to high radix switches of the high radix network, the computer readable medium having instructions encoded thereon, wherein the instructions are executable by a processing unit of a computing system to cause the computing system to:
determine a number of groups into which the nodes of the network topology are divided;
obtain a first complementary base graph and a second complementary base graph, wherein the first and second complementary base graphs are complementary to each other and combine to form a complete graph;

construct intra-group connections of the network topology by connecting the nodes of each group according to the first complementary base graph;

construct inter-group connections of the network topology by:

generating a plurality of permutation matrices, each permutation matrix representing a pattern for selecting a source group and a destination group for each respective inter-group connection of each group; and randomly selecting one permutation matrix to assign to each edge of the second complementary base graph;

wherein an inter-group connection is constructed by identifying a source node and a destination node corresponding to a selected edge of the second complementary base graph, identifying a source group and a destination group according to the permutation matrix assigned to the selected edge, and connecting the source node in the source group to the destination node in the destination group; and output the constructed topology to be implemented in the high radix network.

20. The non-transitory computer readable medium of claim 19, wherein there is no overlap of any row or any column between any pair of permutation matrices in the plurality of permutation matrices, and wherein none of the permutation matrices contain any row or any column that overlaps with an identity matrix.

\* \* \* \* \*